United States Patent [19]

Malaspina et al.

[11] Patent Number: 5,629,599
[45] Date of Patent: May 13, 1997

[54] RECHARGEABLE BATTERY-POWERED COMMUNICATION DEVICE HAVING INTEGRAL VIBRATING MEANS

[75] Inventors: Francis P. Malaspina; George Thomas, both of Plantation, Fla.

[73] Assignee: Motorola, Inc., Schaumburg, Ill.

[21] Appl. No.: 690,377

[22] Filed: Jul. 30, 1996

Related U.S. Application Data

[63] Continuation of Ser. No. 251,413, May 31, 1994, abandoned.

[51] Int. Cl.$^6$ .......................... H01M 10/44; H01M 10/46
[52] U.S. Cl. .................................................. 320/2; 320/46
[58] Field of Search ........................... 320/2, 4, 5, 19, 320/21, 30, 41, 43, 46, 48, 61

[56] References Cited

U.S. PATENT DOCUMENTS

| | | | |
|---|---|---|---|
| 3,852,652 | 12/1974 | Jasinski et al. | 320/35 |
| 3,963,976 | 6/1976 | Clark et al. | 320/21 |
| 4,123,598 | 10/1978 | Hammel et al. | 320/14 |
| 4,302,714 | 11/1981 | Yefsky et al. | 320/35 |
| 4,329,406 | 5/1982 | Dahl et al. | 429/92 |
| 4,388,583 | 6/1983 | Krueger et al. | 320/46 |
| 4,636,741 | 1/1987 | Mitzlaff et al. | 330/127 |
| 4,728,877 | 3/1988 | Adamson et al. | 320/21 |
| 5,115,182 | 5/1992 | Ehmke et al. | 320/14 |
| 5,436,548 | 7/1995 | Thomas | 320/2 |

OTHER PUBLICATIONS

Japanese Kokai Patent, SHO 57–180878, Nov. 8, 1982.
Japanese Kokai Patent, HEI 4–274175, Sep. 30, 1992.
The Effect of Mechanical Excitation on Ionic Conductivity and Related Properties of Polymer Electrolytes J. Electrochem. Soc. vol. 140, No. 2, Feb. 1993, pp. 320–323, Binod Kumar Peter T. Weissman.

*Primary Examiner*—Edward Tso
*Attorney, Agent, or Firm*—Kenneth M. Massaroni

[57] ABSTRACT

A system for charging a battery (22) including a power supply (70) and a vibration device (48) to enhance charging. The vibration device (48) may be the speaker of an electronic communication device (30).

7 Claims, 3 Drawing Sheets

RECHARGEABLE BATTERY-POWERED COMMUNICATION DEVICE HAVING INTEGRAL VIBRATING MEANS

CROSS REFERENCE TO RELATED APPLICATIONS

This is a continuation of U.S. patent application Ser. No. 08/251,413 filed on May 31, 1994, now abandoned. This application is related to U.S. Pat. No. 5,436,548, issued Jul. 25, 1995, entitled BATTERY CHARGING AND DISCHARGING SYSTEM AND CORRESPONDING METHOD by George Thomas, and assigned to Motorola, Inc.

TECHNICAL FIELD

This invention relates in general to rechargeable battery-powered electrical communication devices, and more particularly to electrical communication devices having integral means for assisting in the charging of said rechargeable battery.

BACKGROUND

Ultrasonic vibration has been demonstrated to be very effective for enhancing the rate capabilities of batteries while retaining full capacity. This was demonstrated in U.S. Pat. No. 5,436,548 which teaches providing mechanical vibration means to facilitate ion diffusion in electrochemical cells. Vibration results in enhanced charging/discharging efficiencies, higher electrochemical storage capacities, and improved cycle life. In the aforementioned '548 patent there is provided a means for mechanical vibration consisting of an ultrasonic transducer contained in the battery housing or in a battery charger, and mechanically coupled to the battery cells. The disclosure of the '548 patent is incorporated herein by reference.

U.S. Pat. No. 5,378,551 to Meadows, et al, and commonly assigned teaches an improvement to the '548 patent wherein the vibrating means is integral to the battery cell itself. The disclosure of the '548 patent is also incorporated herein by reference. Both of these applications describe significant advances in the art of enhanced battery charging and discharging. The aforementioned applications, however, are not able to address all batteries which are currently on the market. For example, most batteries manufactured do not include vibration means integral therein. Further, most battery chargers manufactured heretofore do not contain integral vibration means.

It would thus be highly desirable and a contribution to the art to make a device that would allow for ultrasonic vibration of the battery cell during charging, while avoiding placement of the ultrasonic vibration device in either the charger or the battery itself.

SUMMARY OF THE INVENTION

Briefly, according to the invention, there is provided a system for charging a battery in a battery powered communications device. The system includes a power supply and at least one speaker means integral to said device. The speaker is adapted to vibrate the battery while the power supply provides a charging current thereto.

Further according to an alternate embodiment of the invention, there is provided an electronic communication device including a rechargeable electrochemical cell for powering the communication device. The device further includes at least a speaker for transmitting and receiving audio frequency information via the device. The speaker is further adapted to ultrasonically vibrate said electrochemical cell during the charging thereof.

DETAILED DESCRIPTION OF THE PREFERRED EMBODIMENT

Figure 1:
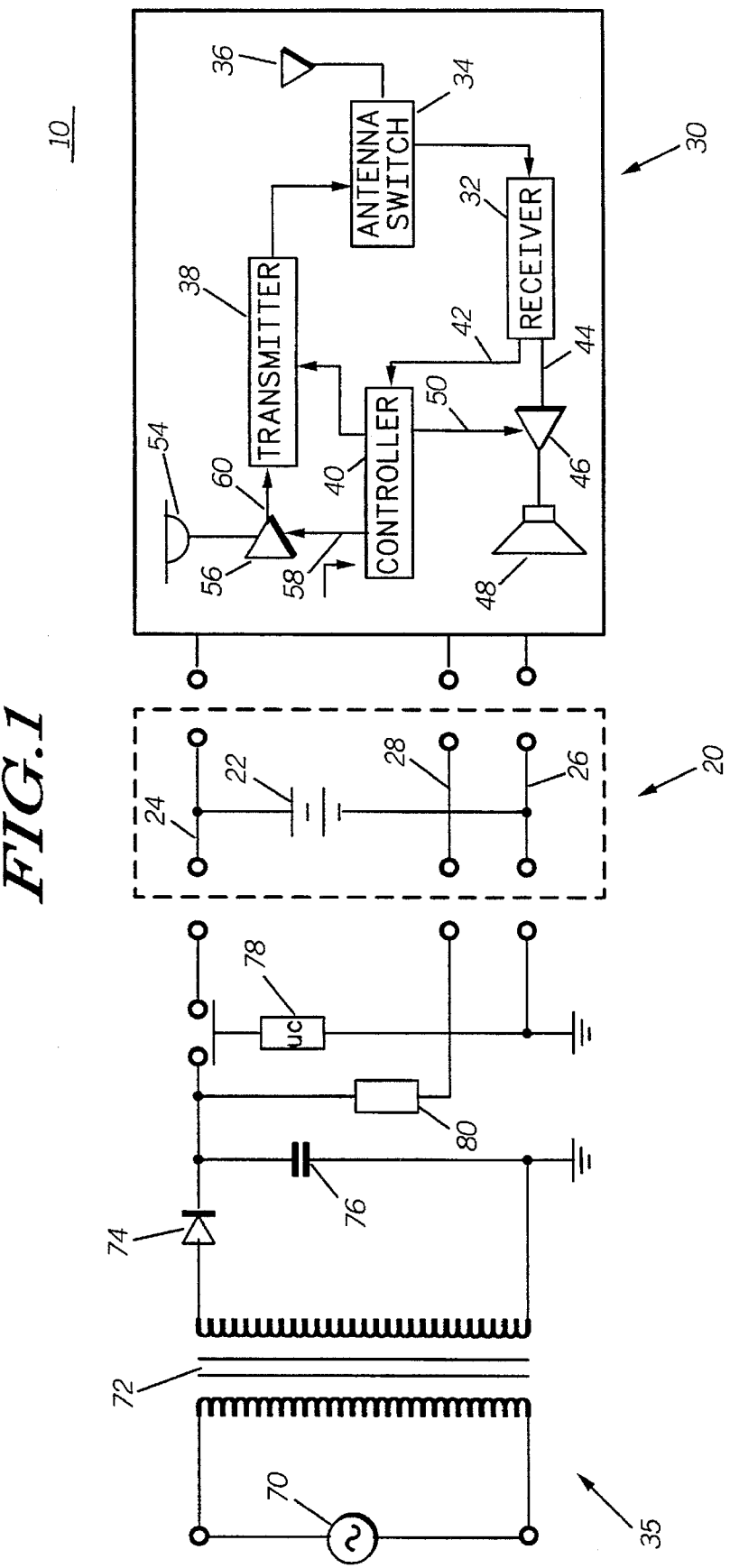
FIG. 1 is a schematic circuit diagram of the electronic circuitry of the device in accordance with the present invention.

While the specification concludes with claims defining the features of the invention that are regarded as novel, it is believed that the invention will be better understood from a consideration of the following description in conjunction with the drawing figures, in which like reference numerals are carried forward.

Referring now to FIG. 1, there is illustrated therein a schematic circuit diagram of a rechargeable electrochemical cell powered electronic communication device and associated battery charging device (10). More particularly, the device (10) includes a rechargeable electrochemical cell pack (20) such as a rechargeable battery. The device (10) further includes an electronic communication device (30) such as a portable radio, portable telephone, radio, pager, or any other portable communication device as is known in the art. The device (10) also includes a battery charging device (35).

In accordance with the present invention, the communication device (30) includes a receiver (32), and an antenna switch (34) to selectively couple an antenna (36) to either the receiver (32) or a transmitter (38). Both the receiver (32) and the transmitter (38) are of conventional design as known in the art. To receive a message, a radio frequency signal is routed from the antenna (36) to the receiver (32). The receiver provides radio information signals to a controller (40) in the form of data messages via line (42). The receiver (32) can also provide voice messages via line (44), which is coupled to amplifier (36) for presentation to a speaker (48). The speaker (48) may be controlled by the controller (44) via line (50) and amplifier (46). The controller (44) may further control the device (30) by providing the ability to switch the speaker (48) from transmitting in the audio mode to transmitting at ultrasonic frequencies.

The controller (40) may comprise an MC68HC11F1 microcontroller having on-chip timer circuitry, control circuitry, memory, serial interface, and being capable of interfacing to external memory devices if necessary. An electronic communication device can be incorporated into a transceiver by including transmitter (38). To transmit inbound information signals, the controller sends data messages via line (52) which are then transmitted by transmitter (38). Alternatively, voice messages may be transmitted as well. The radio user speaks into microphone (54) which voice message gets amplified by amplifier (56) which can be controlled by the controller (40) via line (58). The voice messages are then coupled to transmitter (38) via line (60).

The electrochemical cell pack (20) is a series of or can be limited to at least one electrochemical cell as is known in the art. The cell pack (20) may include one or more types of electrochemical energy cells or batteries (22) such as, for example, lead acid, nickel cadmium, lithium, nickel metal hydride, or lithium ion battery. The cell pack (20) further includes at least a pair of electrical contacts (24, 26). The contacts (24 and 26) are adapted to electrically couple the cell pack (20) to the communication device (30) and to the charging device (35). The cell pack (20) further includes electrical coupling circuit (28) adapted to electrically couple the communication device (30) with the battery charging device (35) for powering the device (30) while charging the battery. This function is necessary during the charging of cell pack (20) so as to power the communication device (30) at least sufficiently to cause speaker (48) to vibrate at ultrasonic frequencies during the charging of cell pack (20).

The device (10) further includes the charging device (35). The charging device includes a power source (70). The power source (70) may be an AC power source such as a wall outlet. The charger (35) further includes an AC-to-AC transformer (72). Current provided by the transformer (72) is then filtered and rectified by the combination of diode (74) and capacitor (76). Charge is controlled by a controller (78), which applies charge as appropriate to contacts (24 and 26). The controller (78) further controls an oscillator driver (80), which is connected to device (30) through battery pack (20) via electrical coupling (28). In this way speaker (48) is made to vibrate while the charging device (35) applies charge to battery (22).

The cell pack (20) and speaker (48) are coupled either ultrasonically, or mechanically, thus the battery may be vibrated, preferably at ultrasonic frequencies in order to provide the needed means for convection mass transport of ions in the cell. Vibration of ultrasonic frequencies, i.e. frequencies in excess of 20,000 Hz are effected by converting the speaker into an ultrasonic transducer.

During the charging process, ultrasonic vibration of the battery (22) increases the mass transport rate of the primary ions (for example, lithium in a lithium battery) across the electrolyte from one electrode of the battery to the other (and also within each electrode). This results in smoother plating and more efficient deposition of the positive ion on the anode, and creates a more efficient electrode. The higher mass transport rate also translates into a considerable increase in rate capability of a battery which thereby considerably decreases the charging time of that battery.

Figure 2:
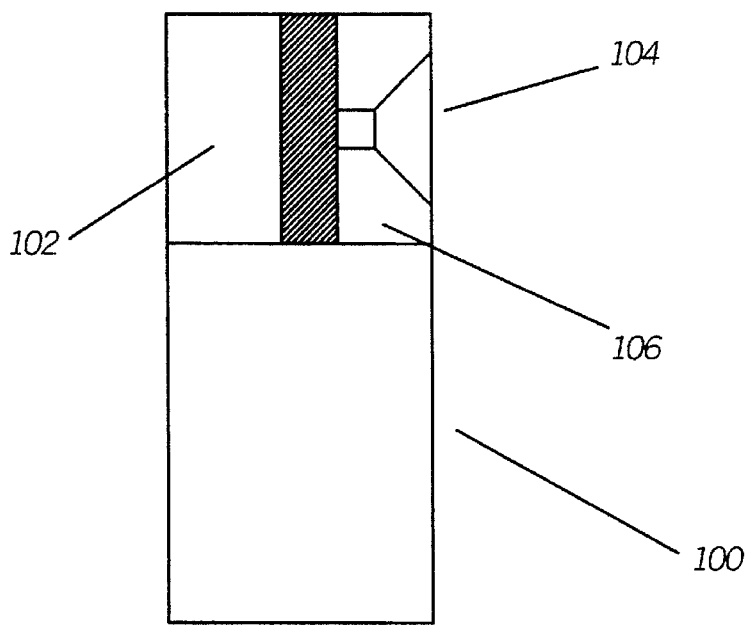
FIG. 2 illustrates a rechargeable electrochemical cell and electronic communications device in accordance with the instant invention.

Referring now to FIG. 2, there is illustrated therein, a first embodiment of an electronic device wherein the speaker (48 of FIG. 1) is adapted to ultrasonically vibrate the electrochemical cell pack (20 of FIG. 1) in accordance with the instant invention. In FIG. 2, the electronic device (100) includes a cell pack (102) and a speaker (104). The speaker (104) is positioned at one edge of the device (100) and placed in such a manner that the sound transmitter, such as a ceramic plate (106) attached to the speaker rests on the cell pack. The cell pack itself is also placed at the edge of the electronic device (100). When the device (100) is placed in a battery charger, the speaker (104) vibrates the cell pack (102) at ultrasonic frequencies while the battery is being charged.

Figure 3:
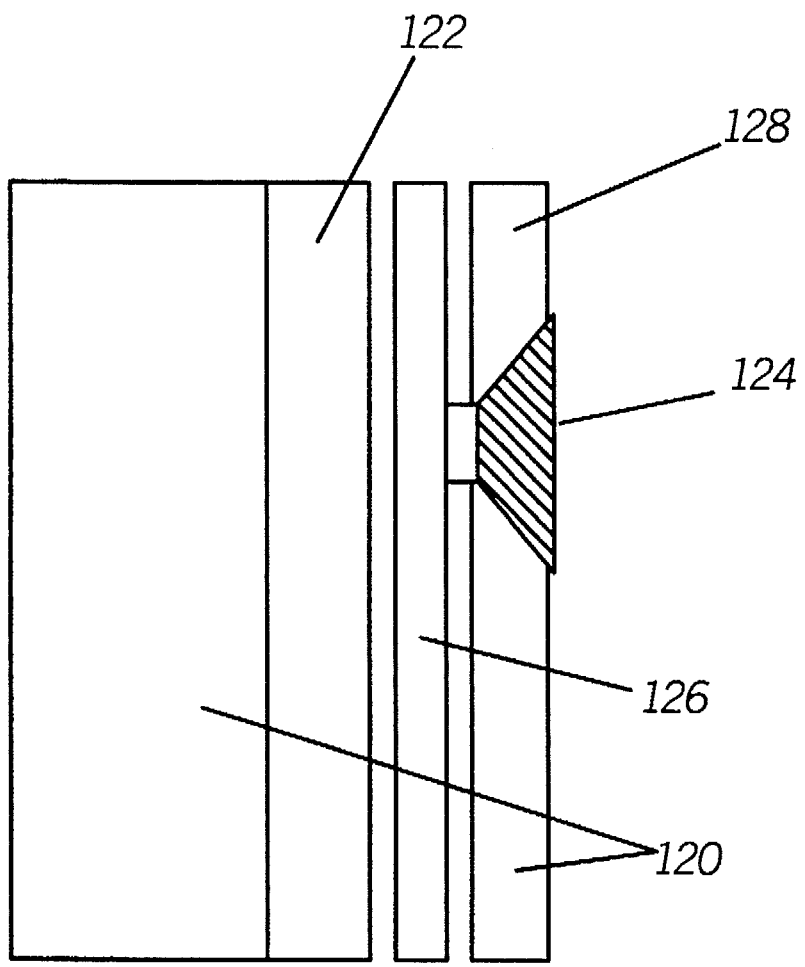
FIG. 3 illustrates an alternate embodiment of an electrochemical cell and electronic communication device in accordance with the instant invention.

An alternate embodiment of the instant invention is illustrated in FIG. 3 wherein the battery/speaker arrangement is placed in the front of the communication device. Specifically, the communication device (120) surrounds battery (122). Speaker (124) is formed integrally with the front (128) of the device (120), and rests on a sound transmitter ceramic plate (126). In this way, the speaker (124) is mechanically coupled to the battery (122) via ceramic plate (126) so as to ultrasonically vibrate the battery (122) during the charging thereof. This of course results in the higher charge rates described hereinabove.

Figure 4:
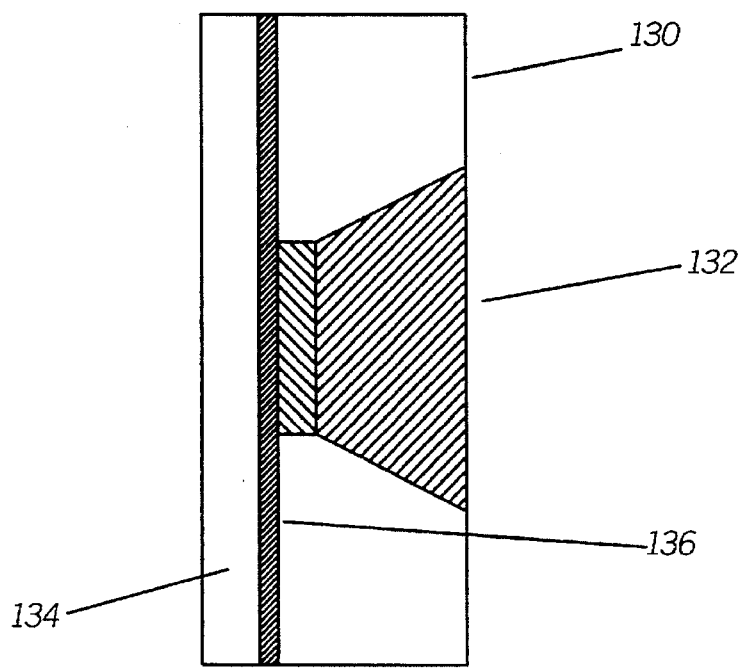
FIG. 4 illustrates a third alternate embodiment of an electrochemical cell and electronic communications device in accordance with the instant invention.

Referring now to FIG. 4, there is illustrated therein yet another embodiment of the instant invention. In this embodiment, the electronic device (130) includes speaker (132) mounted in an aperture in the device (130). The speaker (132) is further mounted in such a manner that it's back is positioned against the battery (134) through the ceramic interface (136). In this arrangement, when the battery is inserted into the radio and the whole assembly is placed in a charger, the speaker is able to vibrate the battery thus enabling the fast charge.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. An electronic communication device comprising:

a rechargeable electrochemical cell for powering said communication device;

a speaker for transmitting received audio frequency information and further adapted to ultrasonically vibrate said electrochemical cell during charging thereof; and wherein said speaker further includes switching means for switching between audio and ultrasonic frequencies.

2. A device as defined in claim 1, wherein said speaker and said electrochemical cell are mechanically coupled.

3. A device as defined in claim 1, wherein said speaker and said electrochemical cell are ultrasonically coupled.

4. A device as defined in claim 1, wherein said speaker is powered by a power supply during charging of said electrochemical cell.

5. An electronic device, comprising:

a cell pack for powering said electronic device;

a speaker, having a back, disposed in said electronic device, said back of said speaker disposed against said cell pack, said speaker producing both audible and ultrasonic vibrations; and wherein said speaker vibrates said cell pack while said cell pack is being recharged to achieve an increased mass transport rate within said cell pack.

6. A method of charging a battery in an electronic device, comprising the steps of:

providing a speaker capable of generating both audible and ultrasonic vibrations in contact with said battery;

applying a charging current to said battery; and vibrating said battery with ultrasonic vibrations from said speaker while performing said step of applying.

7. A method as recited in claim 6, further comprising the step of switching the speaker between audio and ultrasonic frequencies.

* * * * *